(12) United States Patent
Mizuno et al.

(10) Patent No.: US 6,500,392 B2
(45) Date of Patent: *Dec. 31, 2002

(54) CATALYST FOR EXHAUST GAS PURIFICATION AND SYSTEM FOR EXHAUST GAS PURIFICATION

(75) Inventors: Hiroshige Mizuno, Tajimi (JP); Naomi Noda, Ichinomiya (JP); Yukinari Shibagaki, Kounan (JP); Akira Takahashi, Nagoya (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,206

(22) Filed: Dec. 4, 1997

(65) Prior Publication Data

US 2002/0057997 A1 May 16, 2002

(30) Foreign Application Priority Data

Dec. 20, 1996 (JP) ................................................ 8-341834

(51) Int. Cl.⁷ .......................... B01D 53/92; B01J 23/44; B01J 23/58; F01N 3/20
(52) U.S. Cl. ........................ 422/177; 422/171; 422/180; 502/328
(58) Field of Search ................................ 422/171, 174, 422/177, 180, 211, 222; 502/325, 328; 60/299

(56) References Cited

U.S. PATENT DOCUMENTS 5,296,198 A * 3/1994 Abe et al. ................... 422/180
6,139,808 A * 10/2000 Mizuno et al. ............. 422/171

FOREIGN PATENT DOCUMENTS

| EP | 0 358 123 A2 | 3/1990 |
|---|---|---|
| JP | 5-168926 | 7/1993 |
| JP | 5-237384 | 9/1993 |
| JP | 6-154606 | 6/1994 |
| JP | 9-000928 | 1/1997 |

OTHER PUBLICATIONS

Derwent Accession on Questel, week 9406, London: Derwent Publications Ltd., AN 94–045140, & JP 6–378 A (Nissan Motor) 01/94.
Derwent Accession on Questel, week 9310, London: Derwent Publications Ltd., AN 93–079630, & JP 5–23599 A (Nippon Shokubai) 02/93.
Derwent Accession on Questel, week 7805, London: Derwent Publications Ltd., AN 78–09554A, & JP 52–152891 A (Nissan Motor) 12/77.

* cited by examiner

Primary Examiner—Hien Tran
(74) Attorney, Agent, or Firm—Parkhurst & Wendel, L.L.P.

(57) ABSTRACT

A catalyst for exhaust gas purification is capable of purifying the hydrocarbons, nitrogen oxides and carbon monoxide present in the exhaust gas discharged from an internal combustion engine. The catalyst has a monolithic carrier and a catalyst layer containing Pd, Ba and a heat-resistant inorganic oxide, formed on the carrier. The amount of Pd supported on monolithic carrier is 100–300 g per ft³ of monolithic carrier ($3.53 \times 10^{-3}$ to $1.06 \times 10^{-2}$ g per cc of monolithic carrier), the amount of Ba supported on monolithic carrier is 0.010-0.060 g per cc of monolithic carrier in terms of BaO, and the weight ratio of Pd and Ba as expressed as BaO is 1:2 to 1:10. This catalyst for exhaust gas purification is superior particularly in hydrocarbon purification for a low-temperature fuel-rich exhaust gas (such as exhaust gas emitted during cold start) of automobile.

17 Claims, 2 Drawing Sheets

CATALYST FOR EXHAUST GAS PURIFICATION AND SYSTEM FOR EXHAUST GAS PURIFICATION

BACKGROUND OF THE INVENTION

1. Field of the Invention

The present invention relates to a catalyst used for purifying the harmful substances such as hydrocarbons (HC), nitrogen oxides (NOx), carbon monoxide (CO), etc. present in the exhaust gas discharged from an internal combustion engine of automobile or the like.

2. Description of Related Art

Various catalyst techniques have heretofore been proposed for purification of the exhaust gas discharged from an internal combustion engine of automobile or the like. Recently, there have been proposed a number of catalysts comprising not only a noble metal (e.g. Pd) (which is an ordinary catalyst active component) but also an alkaline earth metal or an oxide thereof. For example, in Japanese Patent Application Laid-Open No. 237384/1993, a catalyst is disclosed for exhaust gas purification obtained by supporting, on a monolithic structure, a catalyst active component containing a noble metal (e.g. Pd or Rh), an alkaline earth metal oxide, a lanthanum oxide, a cerium oxide, a zirconium oxide and a heat-resistant inorganic oxide.

In recent years, it has been one of the most important technical tasks to effectively purify the unburnt combustible components (e.g. HC, CO and $H_2$), in particular, HC discharged during the cold start of automobile engine. During the cold start, the engine is usually operated in a rich fuel-to-air ratio and HC is contained in the exhaust gas in a large amount; meanwhile, the catalyst used is still below the operating temperature and its purification ability is low; as a result, a large portion of HC tends to be discharged into the atmosphere without being purified, that is, in an unburnt state. Hence, a technique is desired which can effectively purify the HC present in the exhaust gas discharged during the cold start of engine.

When the above-mentioned prior art is investigated from such a standpoint, the catalyst disclosed in Japanese Patent Application Laid-Open No. 237384/1993 uses an alkaline earth metal oxide in order to increase the Pd purifiability for NOx in a fuel-rich atmosphere; however, the literature pays little attention to the purification of HC and CO in a fuel-rich atmosphere.

OBJECT AND SUMMARY OF THE INVENTION

The present invention has been completed in view of the above situation. The object of the present invention is to provide a catalyst for exhaust gas purification wherein a particular alkaline earth metal and a noble metal are used as catalyst components, the amounts of these components supported on a carrier are optimized for allowing the catalyst to have improved low-temperature light-off performance and, thereby, the catalyst's purification ability for, in particular, HC is increased in a low-temperature and fuel-rich atmosphere such as experienced during the cold start of automobile engine.

According to the present invention, there is provided a catalyst for exhaust gas purification capable of purifying the hydrocarbons, nitrogen oxides and carbon monoxide present in the exhaust gas discharged from an internal combustion engine, which catalyst comprises a monolithic carrier and a catalyst layer containing Pd, Ba and a heat-resistant inorganic oxide, formed on the carrier, wherein the amount of Pd supported on monolithic carrier is 100–300 g per $ft^3$ of monolithic carrier ($3.53 \times 10^{-3}$ to $1.06 \times 10^{-2}$ g per cc of monolithic carrier), the amount of Ba supported on monolithic carrier is 0.010-0.060 g per cc of monolithic carrier in terms of BaO, and the weight ratio of Pd and Ba as expressed as BaO is 1:2 to 1:10.

According to the present invention, there is also provided a system for exhaust gas purification comprising:

the above-mentioned catalyst for exhaust gas purification, provided in the exhaust pipe of an internal combustion engine, and an adsorbent having hydrocarbon adsorbability, also provided in the exhaust pipe.

DETAILED DESCRIPTION OF THE PREFERRED EMBODIMENT

Alkali metals, alkaline earth metals, oxides thereof, etc. have an electron-donating property. Use of such an electron-donating substance as a catalyst component together with a noble metal, in a catalyst allows the resulting catalyst to have improved low-temperature light-off performance. The reason for improvement in low-temperature light-off performance by use of an electron-donating substance is explained as follows.

When a catalyst comprises a carrier and a noble metal supported thereon and comprises no electron-donating substance, the noble metal is covered at the surface with the CO, HC, etc. present in the exhaust gas discharged from an automobile engine, at low-temperatures (e.g. during the cold start). As a result, $O_2$ is unable to contact with the noble metal and there takes place substantially no purification reaction (oxidation reaction) of CO and HC. As the temperature of the noble metal rises owing to the heat of exhaust gas, etc., the covering of the noble metal surface with CO and HC is weakened owing to the thermal vibration or energy of the noble metal; $O_2$ contact with the noble metal becomes possible; and a purification reaction of CO and HC is started.

In contrast, when an electron-donating substance is present close to the noble metal, electrons are donated to the noble metal from the electron-donating substance. As a result, the bonding of the noble metal with CO and HC is weakened; $O_2$ can contact the noble metal easily; and a purification reaction takes place at relatively low temperatures.

In the catalyst for exhaust gas purification according to the present invention, the catalyst layer requisitely contains Ba as an electron-donating substance. Ba was selected as an electron-donating substance because Ba has a high electron-donatability, is highly heat-resistant and is low in vaporization when subjected to a high-temperature exhaust gas. Incidentally, when used in an actual catalyst, Ba is present as an oxide, i.e. BaO.

In the catalyst for exhaust gas purification according to the present invention, the catalyst layer requisitely contains, as well, Pd as a noble metal component. Pd is inexpensive, is highly heat-resistant, and has a high purification ability for HC and CO; therefore, when used in combination with Ba for improvement in low-temperature light-off performance, Pd can exhibit a high purification ability particularly in a fuel-rich atmosphere such as experienced during the cold start of a engine.

The catalyst layer of the present catalyst further contains a heat-resistant inorganic oxide of large specific surface area which functions as a substrate for supporting Pd and/or Ba in a highly dispersed state. Suitable as this heat-resistant inorganic oxide are active alumina, zirconia, silica, titania, zeolite, etc. Of these, an active alumina having a specific surface area of 50 m$^2$/g or more is preferred. When Pd is supported on such an active alumina having a high specific surface area, Pd can be supported thereon in a highly dispersed state and, moreover, can have a large surface area for contact with exhaust gas.

The catalyst for exhaust gas purification according to the present invention is constituted by forming, on a monolithic carrier by coating, a catalyst layer containing Ba, Pd and a heat-resistant inorganic layer all mentioned above. The monolithic carrier refers to a structure having a large number of passages divided by partition walls and is generally called a honeycomb structure. Suitable as the material for the monolithic carrier are ceramic materials such as cordierite, mullite and the like; foil-shaped metallic materials made of heat-resistant stainless steel such as Fe—Cr—Al alloy or the like; and metallic materials molded into a honeycomb structure by powder metallurgy.

The passage shape (cell shape) of the monolithic carrier may be any of circular, polygonal, corrugated, etc. The external form of the monolithic carrier can be any as long as it is suited for the internal form of an exhaust gas system in which the present catalyst is provided. The cell density of the monolithic carrier is not particularly restricted but is preferably 6–1,500 cells/in.$^2$ (Cpi$^2$) (0.9–233 cells/cm$^2$). The partition wall thickness of the monolithic carrier is preferably 50–2,000 $\mu$m.

The monolithic carrier may be porous or non-porous and there is no restriction as to the porosity. However, the porosity is preferably 0–50%, more preferably 5–25% in view of the strength, oxidation resistance, corrosion resistance and adhesivity to catalyst layer. It is possible to use a monolithic carrier provided with electrodes for electrification, i.e. a honeycomb heater.

Formation of a catalyst layer on the monolithic carrier is usually conducted by coating, on a monolithic carrier, a slurry containing the components of the catalyst layer. The slurry used for formation of the catalyst layer, preferably has a pH of 10 or more. The reason is not clear, but it has been found out that a catalyst layer formed with a slurry having a pH of 10 or more, as compared with when using a slurry having a pH of less than 10, gives a catalyst of high purification ability.

In the catalyst for exhaust gas purification according to the present invention, the amount of Pd supported is 100–300 g per ft$^3$ of monolithic carrier (3.53×10$^{-3}$ to 1.06×10$^{-2}$ g per cc of monolithic carrier), preferably 140–240 g per ft$^3$ (4.94×10$^{-3}$ to 8.47×10$^{-3}$ g per cc), more preferably 16–220 g per ft$^3$ (5.65×10$^{-3}$ to 7.77×10$^{-3}$ g per cc). When the amount of Pd supported is less than 100 g per ft$^3$ (3.53×10$^{-3}$ g per cc), the absolute amount of Pd is insufficient for the HC discharged during the cold start of an engine, resulting in insufficient HC purification. Meanwhile, when the amount of Pd supported is more than 300 g per ft$^3$ (1.06×10$^{-2}$ g per cc), the distance between Pd molecules is small and Pd tends to cause cohesion, resulting in lower purification by Pd.

The amount of Ba supported is 0.010-0.060 g per cc of monolithic carrier, preferably 0.015-0.045 g per cc, in terms of BaO. When the amount of Ba supported is less than 0.010 g per cc in terms of BaO, the electron-donating effect of Ba is insufficient. When the amount is more than 0.060 g per cc, the catalyst easily undergoes thermal deterioration owing to the sintering, resulting in inferior durability of the catalyst.

Further in the present invention, the weight ratio of Pd and Ba (as expressed as BaO) contained in the catalyst, i.e. the weight ratio of Pd and BaO is specified to be 1:2 to 1:10, preferably 1:2.5 to 1:5. When the weight of BaO is less than 2 times the weight of Pd, the amount of electrons donated to Pd is insufficient and the covering of Pd surface with HC and CO in a low-temperature fuel-rich atmosphere such as experienced during the cold start of engine (in this state, $O_2$ is unable to contact with Pd) is not sufficiently eliminated; as a result, improvement in purification ability is small.

Meanwhile, when the weight of BaO is more than 10 times the weight of Pd, the amount of electrons donated to Pd is excessive and HC and CO are unable to contact with Pd. As a result, $O_2$ is present on Pd but there is no HC or the like (to be purified) on the Pd, resulting in no purification of HC or the like. Further, when, as mentioned later, in the production of a catalyst layer, Pd is first dispersed in and supported on a heat-resistant inorganic oxide (e.g. active alumina) and then Ba is supported, part of Pd is covered by BaO and the amount of Pd necessary for purification is insufficient.

The thickness of the catalyst layer formed on the monolithic carrier is preferably 10–150 $\mu$m. When the thickness is smaller than 10 $\mu$m, the resulting catalyst has a problem in durability. When the thickness is larger than 150 $\mu$m, the diffusion of exhaust gas deep into the inner part of the catalyst layer is difficult and the inner part of the catalyst layer is not effectively utilized.

In the present invention, it is preferable that Pd and Ba contained in the catalyst layer are supported on a heat-resistant inorganic oxide (e.g. active alumina) also contained in the catalyst layer. In that case, when Pd has no direct contact with the heat-resistant inorganic oxide and is supported on Ba (actually, Ba is present in the form of BaO) supported on the heat-resistant inorganic oxide, Pd tends to cause sintering and cohesion; as a result, the surface area of Pd effective for purification decreases; and the deterioration of catalyst performance is invited at a relatively early timing.

In order to prevent such deterioration of catalyst performance, it is preferable that Pd is supported on the heat-resistant inorganic oxide in such a manner that at least part of Pd is in direct contact with the inorganic oxide. The Pd supported on the heat-resistant inorganic oxide in direct contact therewith, as compared with the Pd supported on Ba supported on the inorganic oxide, is not liable to cause cohesion, can maintain its highly dispersed state over a long period of time, and promises excellent durability. This is presumed to be because the bonding between Pd and the heat-resistant inorganic oxide is stronger than that between Pd and Ba.

Direct contact of Pd with the heat-resistant inorganic oxide can be attained by, in the production process of the catalyst layer, supporting Pd on the heat-resistant inorganic oxide prior to the supporting of Ba, and then supporting Ba on the Pd-supported heat-resistant inorganic oxide. For the reason mentioned above, it is most preferable that the total amount of Pd is supported on the heat-resistant inorganic oxide in direct contact therewith. However, almost satisfactory durability is obtained if, in the catalyst layer of final catalyst, the amount of Pd supported on the heat-resistant inorganic oxide in direct contact therewith is larger than the amount of Pd supported on Ba supported on the heat-resistant inorganic oxide.

In the present catalyst, the catalyst layer may contain, in addition to Pd, other noble metal such as Rh, Pt or the like. Rh, in particular, is effective for improvement in NOx purifiability. When, in addition to Pd, other noble metal is contained in the catalyst layer, the other noble metal may be mixed with Pd and Ba in the catalyst layer; or, a catalyst layer containing Pd and Ba and a catalyst layer containing other noble metal (and containing no Ba) may be formed, by coating, on two respective monolithic carriers, or on one same monolithic carrier apart in the flow direction of exhaust gas.

Or, the above two catalyst layers may be formed, by coating, on one same monolithic carrier in two laminated layers. In that case, the lamination order of the two catalyst layers is not restricted; that is, any of the layer containing Pd and Ba and the layer containing a noble metal other than Pd (and containing no Ba) may be at the upper (surface) side. However, when Rh is used as a noble metal other than Pd, it is preferable for effective utilization of expensive Rh that a catalyst layer containing Pd and Ba is first formed and then a catalyst layer containing Rh is formed thereon, because this allows easy contact of Rh with exhaust gas.

In the present invention, it is also possible that a plurality of catalyst layers each containing Pd and Ba are formed on respective monolithic carriers, or on the same monolithic carrier apart in the flow direction of exhaust gas, or on the same monolithic carrier in a plurality of laminated layers.

In the present invention, it is also possible that the catalyst layer contains a rare earth element oxide (e.g. $CeO_2$ or $La_2O_3$) having oxygen storability and releasability. By adding a rare earth element oxide, the resulting catalyst can have a wider operational range of three-way catalyst and the three-way purifiability during the steady-state operation of the engine is enhanced. Further, the catalyst layer may contain Zr from the standpoints of improvement in heat resistance of heat-resistant inorganic oxide (e.g. active alumina) or in the improvement of oxygen storability and releasability of $CeO_2$ or the like, although Zr makes no particular contribution to the improvement in low-temperature light-off performance as intended by the present invention.

The catalyst for exhaust gas purification according to the present invention is effective particularly for the purification of low-temperature exhaust gas of fuel-rich composition and is suitable for the purification of the harmful substances present in the exhaust gas discharged from an internal combustion engine during the cold start.

Next, description is made of examples of the method for production of the present catalyst for exhaust gas purification. The production method is divided mainly into the following two methods, i.e. impregnation method and predoping method, depending upon the mode of supporting Pd and/or Ba. In supporting Pd, the predoping method is preferred because in supporting a noble metal, the predoping method gives superior durability than the impregnation method.

Impregnation Method

On a carrier is supported active alumina which is a substrate for supporting Pd and/or Ba thereon in a highly dispersed state. The resulting material is fired to produce an alumina-supported carrier. The alumina-supported carrier is dipped in a solution in which Pd and/or Ba is dissolved, to support Pd and/or Ba on the alumina. The resulting material is dried and fired. To achieve the above-mentioned direct contact of Pd with alumina, it is preferable that (1) the alumina-supported carrier is dipped first in a solution in which Pd is dissolved, then (2) the resulting Pd-supported alumina-supported carrier is dipped in a solution in which Ba is dissolved, and (3) the resulting material is dried and fired.

Predoping Method

On an active alumina powder as substrate is supported Pd and/or Ba. The resulting Pd- and/or Ba-supported alumina powder is supported on a carrier. The resulting material is fired. When Pd and Ba are supported on the same active alumina powder, in order to achieve the above-mentioned direct contact of Pd with the active alumina powder, it is preferable that Pd is first supported on the active alumina powder and then Ba is supported on the resulting Pd-supported active alumina powder.

Then, description is made on the system for exhaust gas purification according to the present invention. As mentioned previously, the present catalyst for exhaust gas purification is superior in low-temperature light-off performance and therefore exhibits early activation and high purification ability during the cold start of the engine. When this catalyst is combined with an adsorbent having HC adsorbability and the combination is provided in the exhaust pipe of an internal combustion engine as a system for exhaust gas purification, the HC discharged from the engine is adsorbed on the adsorbent during the period from the cold start of engine to the activation of catalyst, whereby a higher purification effect is obtained.

In this system for exhaust gas purification, the adsorbent used in combination with the catalyst is preferably one obtained by forming an adsorbent layer made of a HC-adsorbable substance, on a carrier such as a monolithic carrier or the like. The HC-adsorbable substance includes zeolite, active carbon, etc. Since the HC-adsorbable substance must be heat-resistant at temperatures of at least 500° C. for use in the exhaust pipe of internal combustion engine, the HC-adsorbable substance is preferably composed mainly of zeolite, SAPO (silicoaluminophosphate), AlPO (aluminophosphate) or the like. A HC-adsorbable substance mainly composed of zeolite is particularly preferred.

Zeolite may be any of a natural product and a synthetic product and has no particular restriction as to the kind. However, zeolite is preferably one having a $SiO_2/Al_2O_3$ molar ratio of 40 or more, more preferably one having a $SiO_2/$—$Al_2O_3$ molar ratio of 80 or more, in view of the heat resistance, durability and hydrophobicity. Preferable specific examples of zeolite are ZSM-5, USY, β-zeolite, silicalite and metallosilicate.

Zeolite can be used in one kind or in combination of two or more kinds. Combined use of a plurality of zeolites different in pore diameters is preferable because it allows adsorption of various hydrocarbons of different molecular sizes ranging from ethylene, propene, etc. (small molecules) to toluene, xylene, etc. (large molecules). The plurality of zeolites may be present in the adsorbent layer in a mixed state, or may be provided in laminated layers. Or, the plurality of zeolites may be supported on the same carrier apart in the flow direction of exhaust gas. For example, two zeolites may be supported on one same monolithic carrier apart at two sites (upstream and downstream sites) of the carrier, or on respective carriers.

Zeolite may be used as it is. However, in order to suppress coking appearing during the adsorption of HC, etc., it is preferred that at least one noble metal selected from Pt, Pd, Rh, etc. is supported on zeolite. Thereby, zeolite can be regenerated without reducing its adsorbability. As the noble metal supported on zeolite, Pd is preferred because it is mostly inexpensive and allows efficient regeneration of zeolite. The supporting of noble metal on zeolite, when supporting is made directly on zeolite, is preferably conducted by an ion exchange method, in view of the thermal stability. Even when a noble metal is supported on an inorganic oxide such as active alumina or the like and the noble metal-supported inorganic oxide is mixed with zeolite, the regeneratability of zeolite is sufficient. This latter approach is preferred because the resulting adsorbent layer has even a catalytic activity. It is also possible that an adsorbent layer made of zeolite is coated with the above-mentioned noble metal-supported inorganic oxide so that the resulting adsorbent has even a catalytic activity. (Hereinafter, such an adsorbent having even a catalytic activity is called "adsorbent-catalyst".)

It is also preferred to allow zeolite to contain at least one of the ions of Cu, Ag and Au (the group IB elements) because zeolite can have improved HC adsorbability thereby. In that case, since a lower content of the ion results in lower improvement in HC adsorbability, the content of the ion is preferably 20% or more based on the Al atoms of zeolite, more preferably 40% or more.

The carrier for supporting the adsorbent layer composed mainly of zeolite or the like has no particular restriction as to the form, and there can be used carriers of various forms such as monolithic carrier, pellets, beads, rings and the like. Of these, a monolithic carrier is most preferred.

In the system for exhaust gas purification according to the present invention, it is preferred that the adsorbent is provided upstream of the catalyst in the flow direction of exhaust gas. In the present system, the adsorbent adsorbs HC, etc. present in the exhaust gas discharged during the cold start of an internal combustion engine and the adsorbate is desorbed from the adsorbent with the temperature increase of the adsorbent caused by the heat of exhaust gas. Therefore, by providing the catalyst downstream of the adsorbent in the flow direction of exhaust gas, the purification efficiency for the HC, etc. discharged during the cold start can be increased remarkably.

In the present purification system, the HC, etc. adsorbed on the adsorbent is desorbed therefrom with the temperature increase of the adsorbent and purified by the catalyst. As mentioned previously, the catalyst of the present invention, as compared with conventional catalysts, is activated at low temperatures owing to the reaction mechanism involving electron donation; therefore, between the temperature at which HC desorption from the adsorbent starts and the temperature at which the catalyst is activated, the difference is small and, as a result, the HC discharged in a large amount during the cold start can be purified effectively.

In the present exhaust gas purification system, a plurality of the catalysts of the present invention each having excellent low-temperature activation may be used. For example, when each one catalyst of the present invention is provided upstream and downstream of the adsorbent, the HC discharged prior to the activation of the upstream catalyst is adsorbed by the adsorbent, then desorbed, and purified by the downstream catalyst; after the upstream catalyst has been activated, purification is conducted also by the upstream catalyst.

As mentioned previously, the exhaust gas purification catalyst and the exhaust gas purification system both according to the present invention exhibit high purification abilities during the cold start of an internal combustion engine. In order to further increase the purification abilities during the cold start or to increase the purification abilities during the steady-state operation of engine, it is possible to additionally provide a different catalyst in the exhaust pipe of engine. When a different catalyst is provided, for example, downstream of the exhaust gas purification catalyst of the present invention, the different catalyst is heated by the reaction heat generated in the present exhaust gas purification catalyst which is activated at an early timing of cold start and, as a result, can reach its operating temperature earlier than usual. The different catalyst preferably contains Pd as a catalyst active component.

In conducting exhaust gas purification during the cold start of engine by using the exhaust gas purification catalyst or the exhaust gas purification system both according to the present invention, when, for a certain period of cold start, an oxidizing gas (e.g. secondary air) is introduced into the exhaust gas at a site of the exhaust pipe upstream of the catalyst in the flow direction of exhaust gas, or the ratio of air (for combustion) amount and fuel amount is controlled so that the oxygen amount in exhaust gas is increased, the combustion reaction of catalyst is promoted and the early activation of catalyst is achieved. In the present exhaust gas purification system using an adsorbent, as the HC adsorbed on the adsorbent begins to be desorbed with the temperature increase of the adsorbent caused by the heat of exhaust gas, the HC concentration in exhaust gas increases and the oxygen required for purification (combustion) of HC becomes insufficient; hence, the above-mentioned introduction of oxidizing gas or control of the ratio of air amount and fuel amount is preferred for the making-up of oxygen.

EXAMPLES

The present invention is hereinafter described in more detail by way of Examples. However, the present invention is not restricted to these Examples.

[Production of Catalysts]

(Catalyst 1)

An aqueous palladium nitrate solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Pd and $Al_2O_3$ in amounts of Pd=200 g/ft$^3$ (7.06×10$^{-3}$ g/cc) and $Al_2O_3$=0.065 g/cc. The resulting material was subjected to a drying step and a firing step to produce catalyst 1.

(Catalyst 2)

An aqueous platinum chloride solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Pt-predoped $Al_2O_3$ powder. To the Pt-predoped $Al_2O_3$ powder was added an appropriate amount of water. Thereto was added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Pt and $Al_2O_3$ in amounts of Pt=50 g/ft$^3$ (1.77×10$^{-3}$ g/cc) and $Al_2O_3$=0.065 g/cc. The resulting material was subjected to a drying step and a firing step to produce catalyst 2.

(Catalyst 3)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. To the Rh-predoped $Al_2O_3$ powder was added an appropriate amount of water. Thereto was added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Rh and $Al_2O_3$ in amounts of Rh=10 g/ft$^3$ (3.53×10$^{-4}$ g/cc) and $Al_2O_3$= 0.065 g/cc. The resulting material was subjected to a drying step and a firing step to produce catalyst 3.

(Catalyst 4)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba-predoped $Al_2O_3$ powder.

The Pd/Ba-predoped $Al_2O_3$ powder was mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 g/ft$^3$ (7.06×10$^{-3}$ g/cc), BaO=0.04 g/cc and $Al_2O_3$= 0.065 g/cc. The resulting material was subjected to a drying step and a firing step to produce catalyst 4.

(Catalyst 5)

Catalyst 5 was produced in the same manner as in the case of the catalyst 4 except that the amount of Pd supported on monolithic carrier was changed to Pd=50 g/ft$^3$ (1.77×10$^{-3}$ g/cc).

(Catalyst 6)

Catalyst 6 was produced in the same manner as in the case of the catalyst 4 except that the amount of Pd supported on monolithic carrier was changed to Pd=500 g/ft$^3$ (1.77×10$^{-2}$ g/cc).

(Catalyst 7)

Catalyst 7 was produced in the same manner as in the case of the catalyst 4 except that the amount of Ba supported on monolithic carrier was changed to BaO=0.005 g/cc.

(Catalyst 8)

Catalyst 8 was produced in the same manner as in the case of the catalyst 4 except that the amount of Ba supported on monolithic carrier was changed to BaO=0.20 g/cc.

(Catalyst 9)

Catalyst 9 was produced in the same manner as in the case of the catalyst 4 except that the amount of Pd supported on monolithic carrier was changed to Pd=300 g/ft$^3$ (1.06×10$^{-2}$ g/cc) and the amount of Ba supported on monolithic carrier was changed to BaO=0.01 g/cc.

(Catalyst 10)

Catalyst 10 was produced in the same manner as in the case of the catalyst 4 except that the amount of Pd supported on monolithic carrier was changed to Pd=120 g/ft$^3$ (4.24× 10$^{-3}$ g/cc) and the amount of Ba supported on monolithic carrier was changed to BaO=0.06 g/cc.

(Catalyst 11)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba-predoped $Al_2O_3$ powder.

The Pd/Ba-predoped $Al_2O_3$ powder was mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 g/ft$^3$ (7.06×10$^{-3}$ g/cc), BaO=0.04 g/cc and $Al_2O_3$=0.065 g/cc. The resulting material was subjected to a drying step and a firing step to produce catalyst 11.

(Catalyst 12)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was mixed with BaO particles and an appropriate amount of water. Thereto was added an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 g/ft$^3$ (7.06×10$^{-3}$ g/cc), BaO=0.04 g/cc and $Al_2O_3$= 0.065 g/cc. The resulting material was subjected to a drying step and a firing step to produce catalyst 12.

(Catalyst 13)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba-predoped $Al_2O_3$ powder.

The Pd/Ba-predoped $Al_2O_3$ powder was mixed with $CeO_2$ particles and an appropriate amount of water. Thereto was added an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, $Al_2O_3$ and $CeO_2$ in amounts of Pd=200 g/ft$^3$ (7.06×10$^{-3}$ g/cc), BaO=0.04 g/cc, $Al_2O_3$=0.065 g/cc and $CeO_2$=0.03 g/cc. The coated carrier was subjected to a drying step and a firing step to produce catalyst 13.

(Catalyst 14)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba-predoped $Al_2O_3$ powder.

To the Pd/Ba-predoped $Al_2O_3$ powder were added an appropriate amount of water and a powder obtained by mixing $CeO_2$ with an aqueous zirconium oxynitrate solution in a ratio of $CeO_2$/$ZrO_2$=100/10, drying the mixture at 500° C. for 1 hour and firing. To the resulting mixture was added an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, $Al_2O_3$, $CeO_2$ and $ZrO_2$ in amounts of Pd=200 g/ft$^3$ (7.06×10$^{-3}$ g/cc), BaO=0.04 g/cc, $Al_2O_3$=0.065 g/cc, $CeO_2$=0.03 g/cc and $ZrO_2$=0.003 g/cc. The resulting material was subjected to a drying step and a firing step to produce catalyst 14.

(Catalyst 15)

An aqueous palladium nitrate solution, an aqueous barium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 700° C. for 3 hours to obtain a Pd/Ba-predoped $Al_2O_3$ powder. To the Pd/Ba-predoped $Al_2O_3$ powder was added an appropriate amount of water. Thereto was added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 g/ft$^3$ (7.06×10$^{-3}$ g/cc), BaO=0.04 g/cc and $Al_2O_3$=0.065 g/cc. The resulting material was subjected to a drying step and a firing step to produce catalyst 15.

(Catalyst 16)

An aqueous barium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 700° C. for 3 hours to obtain a Ba-predoped $Al_2O_3$ powder. The Ba-predoped $Al_2O_3$ powder was impregnated with an aqueous palladium nitrate solution and an appropriate amount of acetic acid, followed by pulverization in a ball mill for 15 hours. The resulting slurry was dried at 100° C. for 15 hours, pulverized, and fired at 550° C. for 3 hours to obtain a Pd/Ba-predoped $Al_2O_3$ powder.

The Pd/Ba-predoped $Al_2O_3$ powder was mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 g/ft$^3$ (7.06×10$^{-3}$ g/cc), BaO=0.04 g/cc and $Al_2O_3$=0.065 g/cc. The resulting material was subjected to a drying step and a firing step to produce catalyst 16.

(Catalyst 17)

The catalyst 1 was dipped in an aqueous barium nitrate solution to support, on the carrier of the catalyst 1, Pd, Ba and $Al_2O_3$ in amounts of Pd=200 g/ft$^3$ (7.06×10$^{-3}$ g/cc), BaO=0.04 g/cc and $Al_2O_3$=0.065 g/cc. The resulting material was subjected to a drying step and a firing step to produce catalyst 17.

(Catalyst 18)

Catalyst 18 was produced in the same manner as in the case of the catalyst 4 except that the aqueous barium nitrate solution was changed to an aqueous barium hydroxide solution.

(Catalyst 19)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. The Rh-predoped $Al_2O_3$ powder was mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 4). In the slurry was dipped the catalyst 4 to support, on the carrier of the catalyst 4, Rh, Pd, Ba and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc and $Al_2O_3$=0.08 g/cc. The resulting material was subjected to a drying step and a firing step to produce catalyst 19.

(Catalyst 20)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba-predoped $Al_2O_3$ powder.

The Pd/Ba-predoped $Al_2O_3$ powder was mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 10). In the slurry was dipped a catalyst obtained in the same manner as in the catalyst 3 but having a different $Al_2O_3$ content, to support, on the carrier of the catalyst, Rh, Pd, Ba and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc and $Al_2O_3$= 0.08 g/cc. The resulting material was subjected to a drying step and a firing step to produce catalyst 20.

(Catalyst 21)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. Separately, an aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid. The resulting material was pulverized in a ball mill for 15 hours. The resulting slurry was dried at 100° C. for 15 hours, pulverized, and fired at 700° C. for 3 hours to obtain a Pd/Ba-predoped $Al_2O_3$ powder.

The Rh-predoped $Al_2O_3$ powder and the Pd/Ba-predoped $Al_2O_3$ powder were mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Rh, Pd, Ba and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc and $Al_2O_3$=0.08 g/cc. The resulting material was subjected to a drying step and a firing step to produce catalyst 21.

(Catalyst 22)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. The Rh-predoped $Al_2O_3$ powder was mixed with an appropriate amount of water. Thereto was added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) by the upper half in the lengthwise direction, to support, on the carrier, Rh and $Al_2O_3$ in required amounts. The resulting material was subjected to a drying step and a firing step to produce a carrier coated with Rh-supported $Al_2O_3$.

Separately, an aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid. The resulting material was pulverized in a ball mill for 15 hours. The resulting slurry was dried at 100° C. for 15 hours, pulverized, and fired at 700° C. for 3 hours to obtain a Pd/Ba-predoped $Al_2O_3$ powder.

The Pd/Ba-predoped $Al_2O_3$ powder was mixed with an appropriate amount of water. Thereto was added an appropriate amount of acetic acid and an alumina sol having a solid alumina content of 2.5%. The resulting mixture was pulverized in a ball mill for 15 hours to obtain a slurry (pH 10). In the slurry was dipped the above-produced carrier coated with Rh-supported $Al_2O_3$, by the lower half in the lengthwise direction, to support, on the carrier, Rh, Pd, Ba and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc and $Al_2O_3$= 0.08 g/cc. The resulting material was subjected to a drying step and a firing step to produce catalyst 22.

(Catalyst 23)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid. The resulting material was pulverized in a ball mill for 15 hours. The resulting slurry was dried at 100° C. for 15 hours, pulverized, and fired at 700° C. for 3 hours to obtain a Pd/Ba-predoped $Al_2O_3$ powder.

In this manner were obtained two kinds of Pd/Ba-predoped $Al_2O_3$ powders different in composition. Each of the Pd/Ba-predoped $Al_2O_3$ powders was mixed with an appropriate amount of water. Thereto was added an appropriate amount of acetic acid and an alumina sol having a solid alumina content of 2.5%. The resulting material was pulverized in a ball mill for 15 hours to produce two kinds of slurries (pH 10). In one of the slurries was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=120 g/ft$^3$ (4.24×10$^{-3}$ g/cc), BaO= 0.024 g/cc and $Al_2O_3$=0.039 g/cc. The resulting material was subjected to a drying step and a firing step to obtain a catalyst comprising a carrier and a first catalyst layer formed thereon. Successively, the catalyst was dipped in the other slurry to support, on the carrier, Pd, Ba and $Al_2O_3$ in total amounts of Pd=200 g/ft$^3$ (7.06×10$^{-3}$ g/cc), BaO=0.03 g/cc and $Al_2O_3$=0.065 g/cc. The resulting material was subjected to a drying step and a firing step to produce catalyst 23.

(Catalyst 24)

Commercial γ-$Al_2O_3$ was mixed with an aqueous palladium nitrate solution and an appropriate amount of water. Thereto was added an appropriate amount of acetic acid and an alumina sol having a solid alumina content of 2.5%. The resulting mixture was pulverized in a ball mill for 15 hours to obtain a slurry (pH 4). In the slurry was dipped a monolithic carrier (a cordierite honeycomb manufactured by NGK Insulators, Ltd. having a diameter of 93 mm and a length of 100 mm). The resulting material was subjected to a drying step and a firing step to produce a γ-$Al_2O_3$-supported carrier. The γ-$Al_2O_3$-supported carrier was dipped in an aqueous palladium nitrate solution, dried and fired to produce a Pd/$Al_2O_3$-supported carrier. The Pd/$Al_2O_3$-supported carrier was dipped in an aqueous barium nitrate solution to support, on the carrier, Pd, Ba and $Al_2O_3$ in amounts of Pd=200 g/ft$^3$ (7.06×10$^{-3}$ g/cc), BaO=0.04 g/cc and $Al_2O_3$=0.065 g/cc. The resulting material was subjected to a drying step and a firing step to produce catalyst 24.
(Catalyst 25)

Catalyst 25 was produced in the same manner as in the case of the catalyst 19 except that the catalyst 4 was changed to the catalyst 1.
(Catalyst 26)

To commercial γ-$Al_2O_3$ were added cerium acetate and cerium oxide [an oxygen storage capacity (OSC) improver in steady-state operation] in an amount of 30% by weight in terms of oxide. The mixture was wet-pulverized, dried, and calcinated at 550° C. to obtain an $Al_2O_3$—$CeO_2$ compound oxide. This compound oxide was impregnated with an aqueous $H_2PtCl_5$ solution or an aqueous $Rh(NO_3)_3$ solution, dried, and fired at 500° C. to obtain a Pt-supported $Al_2O_3$—$CeO_2$ compound oxide and a Rh-supported $Al_2O_3$—$CeO_2$ compound oxide. To each of these compound oxides were added appropriate amounts of water and acetic acid. One of the resulting mixtures, containing the Pt-supported $Al_2O_3$—$CeO_2$ compound oxide was coated on a monolithic carrier (a cordierite honeycomb manufactured by NGK Insulators, Ltd. having a diameter of 144 mm and a length of 100 mm) to allow the carrier to support 0.15 g/cc of the Pt-supported $Al_2O_3$—$CeO_2$ compound oxide as a first catalyst layer. On the first catalyst layer was coated the other mixture containing the Rh-supported $Al_2O_3$—$CeO_2$ compound oxide, to allow the first catalyst layer to support 0.05 g/cc of the Rh-supported $Al_2O_3$—$CeO_2$ compound oxide as a second catalyst layer. The resulting material was fired at 500° C. to produce catalyst 26. Incidentally, the total amount of supported noble metals in the catalyst 26 was 40 g/ft$^3$ (1.41× 10$^{-3}$ g/cc) (Pt/Rh=5/1).

Production of adsorbent-catalyst 0.12 g/cc of β-zeolite (a product of The PQ Corporation) ($SiO_2$/$Al_2O_3$ molar ratio=150) was supported on a cordierite honeycomb structure (a product of NGK Insulators, Ltd.) having a diameter of 144 mm, a length of 100 mm, a rib thickness of 150 μm and a cell density of 400 cells/in.$^2$). The resulting material was fired at 550° C. to form a first layer of β-zeolite on the honeycomb structure. Separately, to commercial γ-$Al_2O_3$ were added an aqueous palladium nitrate solution and an appropriate amount of acetic acid. The mixture was pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was mixed with an appropriate amount of water. Thereto was added an appropriate amount of acetic acid and an alumina sol having a solid alumina content of 2.5%. The resulting mixture was pulverized in a ball mill for 15 hours to produce a slurry. The slurry was coated on the first layer formed previously on the honeycomb structure, and fired to form a second layer on the first layer, whereby an adsorbent-catalyst was produced. The supported amounts of the second layer were Pd=150 g/ft$^3$ (5.30×10$^{-3}$ g/cc) and $Al_2O_3$=0.05 g/cc.

Evaluation of Light-off Performances of Catalysts

The catalysts 1–25 produced above were evaluated for light-off performance according to the following method. In the exhaust gas line of an actual engine was set any of the above-produced catalysts so that the exhaust gas temperature at the gas inlet became 750° C.; and the engine was operated for 60 seconds at an A/F ratio close to the stoichiometric ratio (14.4). Then, fuel feeding was cut for 5 seconds to shift the A/F ratio to a lean fuel side. In this engine operational mode including the above fuel-cutting, each catalyst was subjected to aging for total 100 hours. To the catalyst after aging was fed an artificial gas having a composition of Table 1 (A/F=14.4), at a space velocity of 40,000 hr$^{-1}$; the gas temperature was increased at a rate of 10° C./min from room temperature; the temperature at which the conversion of HC component in the gas became 50%, was measured and taken as the light-off temperature of the catalyst. The results are shown in Table 2.

TABLE 1

| Component | Concentration |
|---|---|
| $CO_2$ | 13% |
| $O_2$ | 1.3% |
| CO | 1.8% |
| $H_2$ | 0.6% |
| HC | 3,000 ppmC |
| NO | 950 ppm |
| $H_2O$ | 10% |
| $N_2$ | Balance |

TABLE 2

| | Light-off temp. (° C.) | Remarks |
|---|---|---|
| Catalyst 1 | 307 | Pd catalyst (containing no Ba). |
| Catalyst 2 | 393 | Pt catalyst (containing no Ba). |
| Catalyst 3 | 319 | Rh catalyst (containing no Ba). |
| Catalyst 4* | 238 | Present catalyst (standard). |
| Catalyst 5 | 280 | Containing less than 100 g/ft$^3$ of Pd. |
| Catalyst 6 | 275 | Containing more than 300 g/ft$^3$ of Pd. |
| Catalyst 7 | 299 | Containing less than 0.010 g/cc of BaO. |
| Catalyst 8 | 283 | Containing more than 0.060 g/cc of BaO. |
| Catalyst 9 | 288 | Containing BaO of less than 2 times the amount of Pd. |
| Catalyst 10 | 284 | Containing BaO of more than 10 times the amount of Pd. |
| Catalyst 11* | 270 | The slurry used had a pH of less than 10. |
| Catalyst 12* | 252 | Containing Ba in the form of BaO particles. |
| Catalyst 13* | 238 | $CeO_2$ was added. |
| Catalyst 14* | 239 | $CeO_2$ and $ZrO_2$ were added. |
| Catalyst 15* | 246 | Pd and Ba were supported by co-impregnation (simultaneous supporting). |
| Catalyst 16* | 258 | Ba was supported first and then Pd was supported. |
| Catalyst 17* | 251 | Pd was supported by predoping and Ba was supported by impregnation. |
| Catalyst 18* | 248 | Barium hydroxide was used for supporting of Ba. |
| Catalyst 19* | 238 | The surface layer contained Rh and the inner layer contained Pd/Ba. |
| Catalyst 20* | 238 | The surface layer contained Pd/Ba and the inner layer contained Rh. |
| Catalyst 21* | 257 | The catalyst layer contained Pd, Ba and Rh in a mixed state. |
| Catalyst 22* | 241 | The Pd/Ba-containing layer and the Rh-containing layer were supported apart on the carrier. |
| Catalyst 23* | 238 | Two Pd/Ba-containing layers different in composition were supported on the carrier in laminated layers. |
| Catalyst 24* | 260 | Both Pd and Ba were supported by impregnation. |
| Catalyst 25 | 306 | The surface layer contained Rh and the inner layer contained Pd (but no Ba). |

(The catalysts with a * mark are the catalysts of the present invention.)

Constitution of Exhaust Gas Purification Systems

Using the catalysts and adsorbent-catalyst produced above, exhaust gas purification systems shown below were constituted. Incidentally, each numeral shown in FIGS. 1 to 7 was shown in the following description of each system by adding parenthesis to the numeral to avoid confusion between the symbols indicating the kinds of catalysts and adsorbent-catalyst and the numerals used in FIGS. 1 to 7.

(System A)

Figure 1:
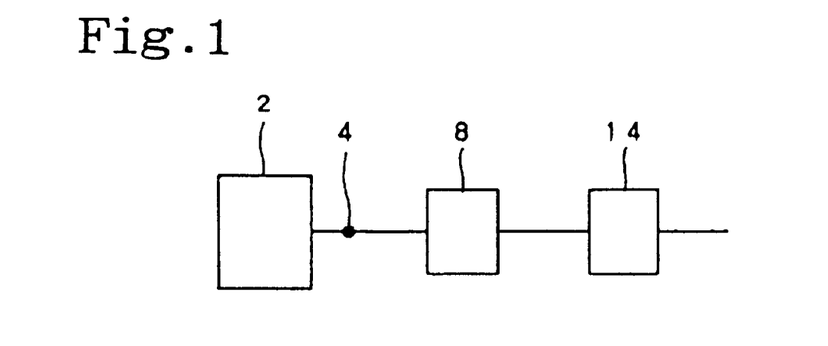
FIG. 1 is a schematic drawing showing a system for exhaust gas purification used in the Example.

As shown in FIG. 1, the catalyst 19 (8) was provided in the exhaust pipe of an engine (2) at an upstream site. Between the engine (2) and the catalyst 19 (8) was provided an $O_2$ sensor (4) for A/F ratio control. The distance between the engine manifold outlet and the catalyst 19 (8) was 600 mm. At a position 1,200 mm distant from the engine manifold outlet was provided the catalyst 26 (14).

(System B)

Figure 2:
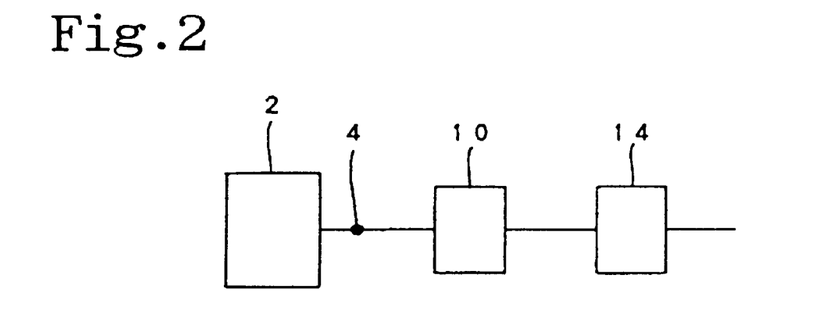
FIG. 2 is a schematic drawing showing a system for exhaust gas purification used in the Example.

As shown in FIG. 2, System B was constituted in the same manner as in the case of System A except that the catalyst 19 (8) was changed to the catalyst 25 (10).

(System C)

Figure 3:
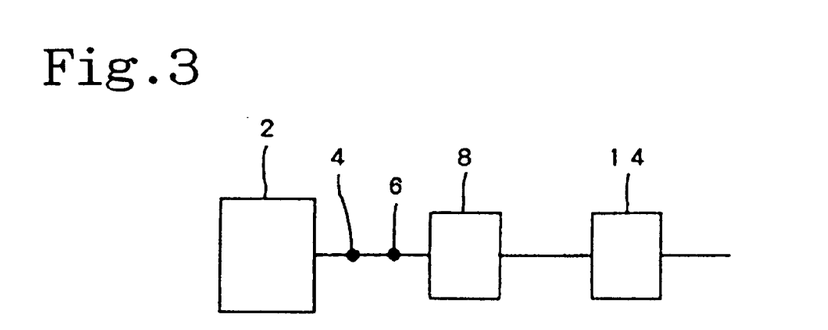
FIG. 3 is a schematic drawing showing a system for exhaust gas purification used in the Example.

As shown in FIG. 3, the catalyst 19 (8) was provided in the exhaust pipe of an engine (2) at an upstream site. Between the engine (2) and the catalyst 19 (8) were provided an $O_2$ sensor (4) for A/F ratio control at an upstream site and a hole (6) for secondary air introduction for promotion of activation at a downstream site. The distance between the engine manifold outlet and the catalyst 19 (8) was 600 mm. At a position 1,200 mm distant from the engine manifold outlet was provided the catalyst 26 (14).

(System D)

Figure 4:
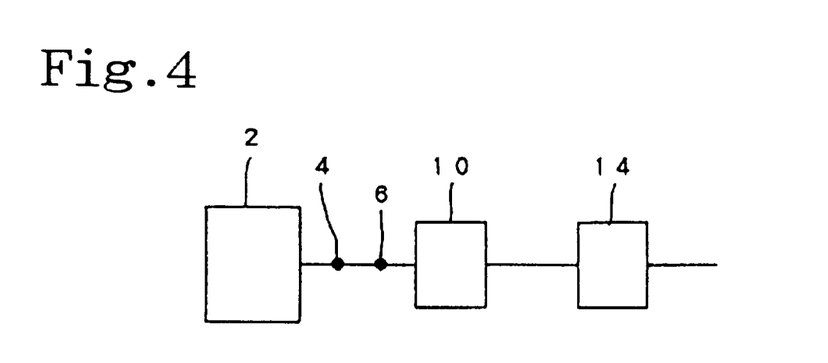
FIG. 4 is a schematic drawing showing a system for exhaust gas purification used in the Example.

As shown in FIG. 4, System D was constituted in the same manner as in the case of System C except that the catalyst 19 (8) was changed to the catalyst 25 (10).

(System E)

Figure 5:
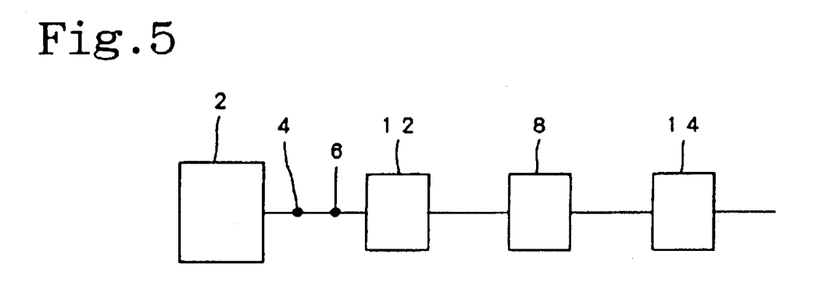
FIG. 5 is a schematic drawing showing a system for exhaust gas purification used in the Example.

As shown in FIG. 5, in the exhaust pipe of an engine (2) were provided the adsorbent-catalyst (12) at an upstream site and the catalyst 19 (8) at a downstream site. Between the engine (2) and the adsorbent-catalyst (12) were provided an $O_2$ sensor (4) for A/F ratio control at an upstream site and a hole (6) for secondary air introduction for promotion of activation at a downstream site. The distance between the engine manifold outlet and the adsorbent-catalyst (12) was 600 mm, and the distance between the adsorbent-catalyst (12) and the catalyst 19 (8) was 30 mm. At a position 1,200 mm distant from the engine manifold outlet was provided the catalyst 26 (14).

(System F)

Figure 6:
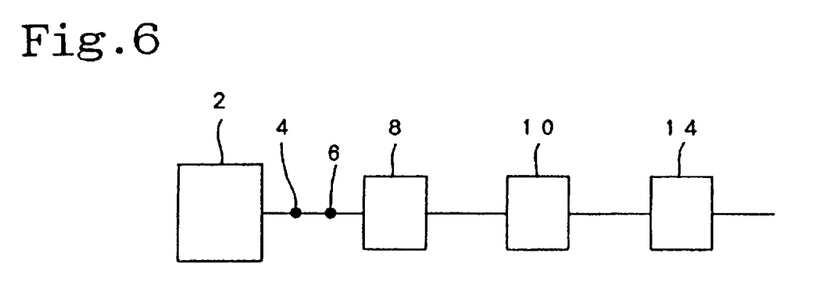
FIG. 6 is a schematic drawing showing a system for exhaust gas purification used in the Example.

As shown in FIG. 6, in the exhaust pipe of an engine (2) were provided the catalyst 19 (8) at an upstream site and the catalyst 25 (10) at a downstream site. Between the engine (2) and the catalyst 19 (8) were provided an $O_2$ sensor (4) for A/F ratio control at an upstream site and a hole (6) for secondary air introduction for promotion of activation at a downstream site. The distance between the engine manifold outlet and the catalyst 19 (8) was 600 mm, and the distance between the catalyst 19 (8) and the catalyst 25 (10) was 30 mm. At a position 1,200 mm distant from the engine manifold outlet was provided the catalyst 26 (14).

(System G)

Figure 7:
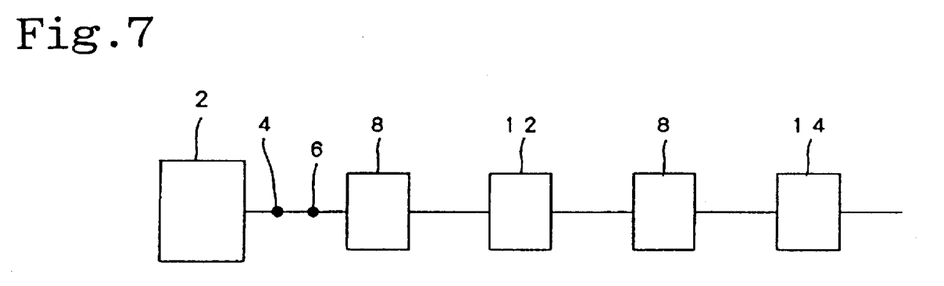
FIG. 7 is a schematic drawing showing a system for exhaust gas purification used in the Example.

As shown in FIG. 7, in the exhaust pipe of an engine (2) were provided the catalyst 19 (8), the adsorbent-catalyst (12) and the catalyst 19 (8) in this order from the upstream side. Between the engine (2) and the catalyst 19 (8) were provided an $O_2$ sensor (4) for A/F ratio control at an upstream site and a hole (6) for secondary air introduction for promotion of activation at a downstream site. The distance between the engine manifold outlet and the catalyst 19 (8) was 600 mm, and the distance between the catalyst 19 (8) and the adsorbent-catalyst (12) was 30 mm. At a position 1,200 mm distant from the engine manifold outlet was provided the catalyst 26 (14).

[Evaluation of Performances of Exhaust Gas Purification Systems]

Each of the above-prepared Systems A to G was fitted to a test vehicle having a six-cylinder engine of 4,000 cc displacement mounted thereon. A FTP (LA-4 mode) was conducted. In Systems C to G, in order to obtain an oxygen-excessive exhaust gas, secondary air was introduced from the hole for secondary air introduction, using an air pump, at a rate of 100 l/min for 90 seconds from the engine cranking. The exhaust gas discharged from the engine was collected by the CVS method and measured for emission values. The results are shown in Table 3. As shown in Table 3, the systems using the present catalyst, as compared with other systems, could give remarkably low emission values.

TABLE 3

|  | HC emission (g/mile) | NOx emission (g/mile) | Secondary air introduction |
|---|---|---|---|
| System A* | 0.113 | 0.32 | No |
| System B | 0.163 | 0.41 | No |
| System C* | 0.099 | 0.38 | Yes |
| System D | 0.129 | 0.56 | Yes |
| System E* | 0.071 | 0.36 | Yes |
| System F* | 0.093 | 0.36 | Yes |
| System G* | 0.060 | 0.35 | Yes |

(The systems with * mark are systems using a catalyst of the present invention.)

As described above, the catalyst for exhaust gas purification according to the present invention is superior in low-temperature light-off performance and can effectively purify the harmful substances present in the exhaust gas discharged from an internal combustion engine of automobile or the like; in particular, the HC discharged in a large amount during the cold start of automobile engine. Further, the system for exhaust gas purification according to the present invention, which comprises the above catalyst superior in low-temperature light-off performance and an adsorbent having HC adsorbability, can even more effectively purify the HC discharged during the cold start.

What is claimed is:

1. A catalyst for exhaust gas purification capable of purifying hydrocarbons, nitrogen oxides and carbon monoxide present in exhaust gas discharged from an internal combustion engine, which catalyst consists of:

a monolithic carrier; and a catalyst layer consisting of Pd, Ba and a heat-resistant inorganic oxide selected from the group consisting of active alumina, zirconia, silica, titania, and zeolite, formed on the carrier, wherein an amount of Pd supported on the monolithic carrier is 100–300 g per ft$^3$ of the monolithic carrier ($3.53 \times 10^{-3}$ to $1.06 \times 10^{-2}$ g per cc of the monolithic carrier), an amount of Ba supported on the monolithic carrier is 0.010-0.060 g per cc of the monolithic carrier in terms of BaO, and a weight ratio of Pd of Ba as expressed as BaO is 1:2 to 1:10.

2. A catalyst for exhaust gas purification according to claim 1, wherein the heat-resistant inorganic oxide is active alumina.

3. A catalyst for exhaust gas purification according to claim 1, wherein the Pd and Ba in the catalyst layer are supported on the heat-resistant inorganic oxide.

4. A catalyst for exhaust gas purification according to claim 3, wherein at least part of the Pd is supported on the heat-resistant inorganic oxide in direct contact therewith.

5. A catalyst for exhaust gas purification according to claim 3, wherein a total amount of Pd is supported on the heat-resistant inorganic oxide in direct contact therewith.

6. A catalyst for exhaust gas purification according to claim 1, wherein said catalyst layer is one formed by coating on the monolithic carrier a slurry containing components of the catalytic layer and having a pH of 10 or more.

7. A catalyst for exhaust gas purification according to claim 1, wherein the catalyst layer is produced by supporting Pd on the heat-resistant inorganic oxide and then supporting Ba on the Pd supported heat-resistant inorganic oxide.

8. A catalyst for exhaust gas purification capable of purifying hydrocarbons, nitrogen oxides and carbon monoxide present in exhaust gas discharged from an internal combustion engine, which catalyst consists of:

a monolithic carrier; and a catalyst layer consisting of Pd, a noble metal other than Pd, Ba and heat-resistant inorganic oxide selected from the group consisting of active alumina, zirconia, silica, titania, and zeolite, formed on the carrier, wherein an amount of Pd supported on the monolithic carrier is 100–300 g per ft$^3$ of the monolithic carrier ($3.53 \times 10^{-3}$ to $1.06 \times 10^{-2}$ g per cc of the monolithic carrier), an amount of Ba supported on the monolithic carrier is 0.010-0.060 g per cc of the monolithic carrier in terms of BaP, and a weight ratio of Pd to Ba as expressed as BaO is 1:2 to 1:10.

9. A catalyst for exhaust gas purification according to claim 8, wherein the noble metal other than Pd is Rh.

10. A catalyst for exhaust gas purification according to claim 8, wherein the catalyst layer is divided into a Pd and Ba containing layer and a layer containing a noble metal other than Pd and containing no Ba wherein the two layers are formed separately on the monolithic carrier by coating.

11. A catalyst for exhaust gas purification according to claim 10, wherein the Pd and Ba containing layer and the layer containing a noble metal other than Pd and containing no Ba are formed in two laminated layer on a monolithic carrier.

12. A catalyst for exhaust gas purification according to claim 11, wherein the layer containing a noble metal other than Pd and containing no Ba is laminated on the Pd and Ba containing layer.

13. A system for exhaust gas purification consisting of:

a catalyst for exhaust gas purification consisting of a monolithic carrier and catalyst layer consisting of Pd, Ba and a heat-resistant inorganic oxide selected from the group consisting of active alumina, zirconia, silica, titania, and zeolite, formed on the carrier, wherein the amount of Pd supported on the monolithic carrier is 100–300 g per ft$^3$ of monolithic carrier ($3.53 \times 10^{-3}$ to $1.06 \times 10^{-2}$ per cc of monolithic carrier), the amount of Ba supported on the monolithic carrier is 0.010-0.60 g per cc of the monolithic carrier in terms of BaO, and a weight ratio of Pd to Ba as expressed as BaO is 1:2 to 1:10, wherein said system is provided in an exhaust pipe for internal combustion engine, and an absorbent having hydrocarbon adsorbability, is provided in said exhaust pipe.

14. A system for exhaust gas purification consisting of:

a catalyst for exhaust gas purification consisting of a monolithic carrier and catalyst layer consisting of Pd, Ba and a heat-resistant inorganic oxide selected from the group consisting of active alumina, zirconia, silica, titania, and zeolite, formed on the carrier, wherein the amount of Pd supported on the monolithic carrier is 100–300 g per ft$^3$ of monolithic carrier ($3.53 \times 10^{-3}$ to $1.06 \times 10^{-2}$ g per cc of monolithic carrier), the amount of Ba supported on the monolithic carrier is 0.010-0.60 g per cc of the monolithic carrier in terms of BaO, and a weight ratio of Pd to Ba as expressed as BaO is 1:2 to 1:10, wherein said system is provided in an exhaust pipe for internal combustion engine, and an adsorbent having hydrocarbon adsorbability and an additional catalyst are provided in said exhaust pipe.

15. A system for exhaust gas purification according to claim 14, wherein the additional catalyst contains Pd as a catalyst active component.

16. A catalyst for exhaust gas purification capable of purifying hydrocarbons, nitrogen oxides and carbon monoxide present in exhaust gas discharged from an internal combustion engine, which catalyst comprises:

a monolithic carrier; and a catalyst layer comprising Pd, Ba and a heat-resistant inorganic oxide, formed on the carrier, wherein (1) an amount of Pd supported on the monolithic carrier is 100–300 g per ft$^3$ of the monolithic carrier ($3.53 \times 10^{-3}$ to $1.06 \times 10^{-2}$ g per cc of the monolithic carrier), (2) an amount of Ba supported on the monolithic carrier is 0.010-0.060 g per cc of the monolithic carrier in terms of BaO, (3) a weight ratio of Pd to Ba as expressed as BaO is 1:2 to 1:10, (4) the Pd and Ba in the catalyst layer are supported on the heat-resistant inorganic oxide, and (5) a portion of the Pd is supported on the heat-resistant organic oxide in direct contact therewith, the remaining portion of the Pd is supported on the Ba supported on the heat-resistant inorganic oxide, the portion of the Pd supported on the heat-resistant inorganic oxide in direct contact therewith being larger than the remaining portion of the Pd supported on the Ba.

17. A catalyst for purifying an exhaust gas, said catalyst consisting of a monolithic carrier and a catalyst layer with catalyst components consisting of Pd, Ba, cerium oxide, and at least one heat resistant inorganic oxide selected from the group consisting of active alumina, zirconia, titania, and zeolite, wherein Pd is present in an amount of from 3.53 g/l to 10.6 g/l, Ba is present in an amount of from 40 g/l to 60 g/l in terms of BaO, and a ratio of Pd to Ba in terms of oxide is within a range of from 1:2 to 1:10.

* * * * *